United States Patent [19]

VanSickle

[11] Patent Number: 4,603,451
[45] Date of Patent: Aug. 5, 1986

[54] HEATED WINDSHIELD WIPER ASSEMBLY

[76] Inventor: Robert O. VanSickle, 25538 New York St., Dearborn Heights, Mich. 48125

[21] Appl. No.: 728,195

[22] Filed: Apr. 29, 1985

[51] Int. Cl.⁴ .............................................. A46B 9/04
[52] U.S. Cl. .................................. 15/250.07; 219/203
[58] Field of Search ........... 15/250.05, 250.06, 250.07, 15/250.08, 250.09; 219/203, 522

[56] References Cited

U.S. PATENT DOCUMENTS

| | | | |
|---|---|---|---|
| 1,937,286 | 11/1933 | McCarthy | 15/250.09 |
| 3,249,959 | 5/1966 | Theckston | 15/250.06 |
| 3,574,881 | 4/1971 | Temple | 15/250.04 |
| 3,587,129 | 6/1971 | Linker | 15/250.04 |
| 3,619,556 | 11/1971 | Deibel et al. | 219/203 |
| 3,639,938 | 2/1972 | Golden | 219/203 |
| 3,718,940 | 3/1973 | Bode | 15/250.06 |
| 3,936,901 | 2/1976 | Theckston | 15/250.04 |
| 4,152,808 | 5/1979 | Andregg | 15/250.07 |
| 4,194,261 | 3/1980 | Parkinson | 15/250.07 |

FOREIGN PATENT DOCUMENTS 2807330  8/1979  Fed. Rep. of Germany ... 15/250.06

Primary Examiner—Peter Feldman
Attorney, Agent, or Firm—Gifford, Groh, VanOphem, Sheridan, Sprinkle & Dolgorkov

[57] ABSTRACT

A heated windshield wiper assembly adapted to be secured to the wiper arm of a motor vehicle. The wiper assembly provides intermittent heat to the wiper blade according to weather conditions to prevent icing of the wiper blade and assembly. The wiper assembly generally comprises a conventional wiper blade supported by a structure having a heating element disposed therein. The heating element is connected to the vehicle power source and can be actuated either manually or automatically. During automatic actuation, the heating element is controlled by a thermostat, which senses the ambient air temperature, and a thermocoupler, which senses the temperature of the heating element and wiper blade.

12 Claims, 6 Drawing Figures

HEATED WINDSHIELD WIPER ASSEMBLY

BACKGROUND OF THE INVENTION

I. Field of the Invention

This invention relates to a windshield wiper assembly for operation in cold weather and, in particular to a heated windshield wiper assembly having a heating element disposed in the wiper blade support structure which is actuated and deactuated according to the temperature of the ambient air and the heating element.

II. Description of the Prior Art

Past known devices have provided various solutions for supplying heat to the wiper system of a motor vehicle in order to minimize icing of the wiper blade and system. These include embedding the heating elements in the flexible wiper blade in order to supply heat to the blade. However, by including the heating element within the wiper blade, the blade does not flex properly when in operation because of the rigid nature of the heating element. Moreover, replacement of the blade, which should be accomplished approximately every twelve months, is expensive since the heating element is discarded along with the wiper blade.

In order to permit less costly replacements to be utilized in a heated wiper system, the heating element is disposed behind a backing member of the blade. This development allows standard wiper blades to be utilized in the wiper system thereby reducing the cost of replacement.

However, the foregoing solution was still inadequate because with either modification the heat produced when the element was left on for excessive periods of time quickly deteriorated the rubber blade. In addition, overheating may cause damage to the wiper system itself. In order to overcome this deficiency, a heat sensitive control was provided in close contact with the heating element. The control unit deactivated the heating element upon reaching a predefined temperature. This modification, however, still required manual actuation of the heating element by the vehicle user. Moreover, no means are provided for overriding the control unit in order to allow continuous heating of the wiper system when conditions required. Finally, because the heat control unit is disposed separately from the heating element, the possibility of overheating remains.

SUMMARY OF THE PRESENT INVENTION

The present invention overcomes the disadvantages of the prior art by providing a heated windshield wiper assembly which utilizes a standard wiper blade and is provided with actuating and deactuating units which are responsive to the temperature of the ambient air and the heating element. The assembly is also provided with means for manually actuating or deactuating the heated wiper assembly.

The wiper assembly according to the present invention generally comprises a wiper blade support assembly which is readily secured to the wiper arm of a motor vehicle and which supports a conventional flexible wiper blade. The heating element of the present invention is secured to the support assembly in close relationship to the wiper blade. The heating element is connected to the vehicle power source and can be controlled either automatically or manually, which overrides the automatic controls. In automatic mode, the heating element is controlled by a pair of temperature responsive control units. The first control unit actuates or deactuates the heating element in response to the ambient air temperature. The second control unit actuates or deactuates the element in response to the temperature of the heating element. The second control unit is preferably disposed in close relation to the heating element.

The present invention provides a heated wiper assembly which automatically controls the heating element for intermittent intervals according to the temperature of the heating element and the ambient air. Thus, deterioration of the wiper blade is reduced and the heating element is actuated only when required by weather conditions. Moreover, the intermittent actuation of the heating element allows the vehicle user to activate the heating assembly while the vehicle is not running, with only minimal discharging of the vehicle's battery.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
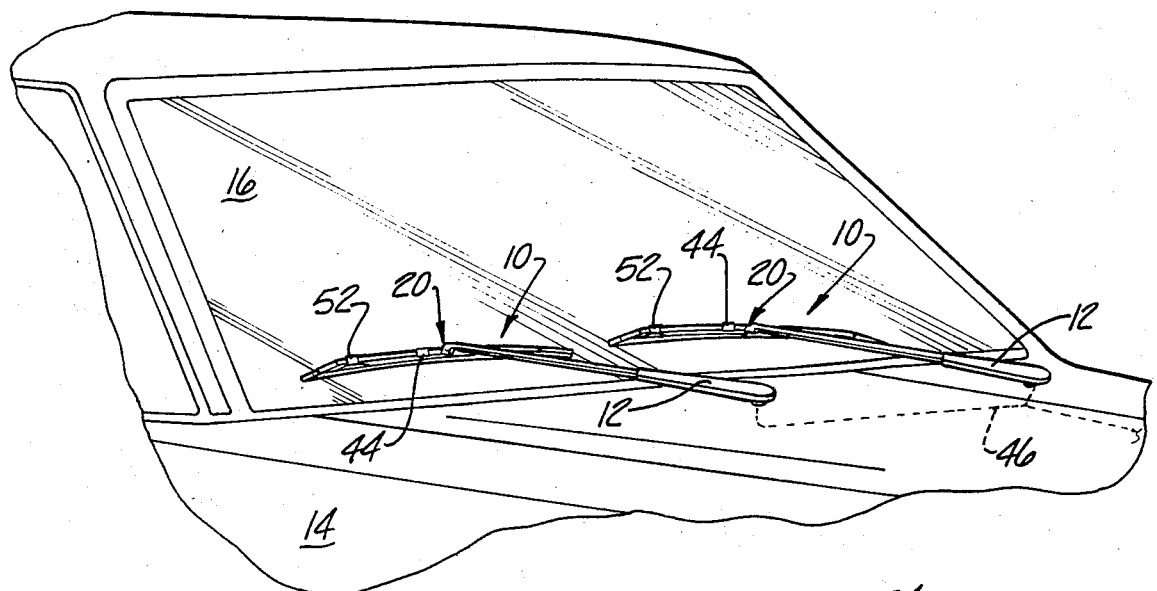
FIG. 1 is a perspective view of the wiper assembly secured to the wiper arms of a motor vehicle.
Figure 3:
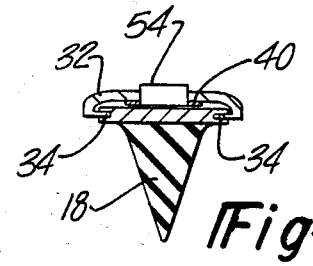
FIG. 3 is a cross-sectional view of the wiper assembly taken along line 3—3 of FIG. 2.
Figure 2:
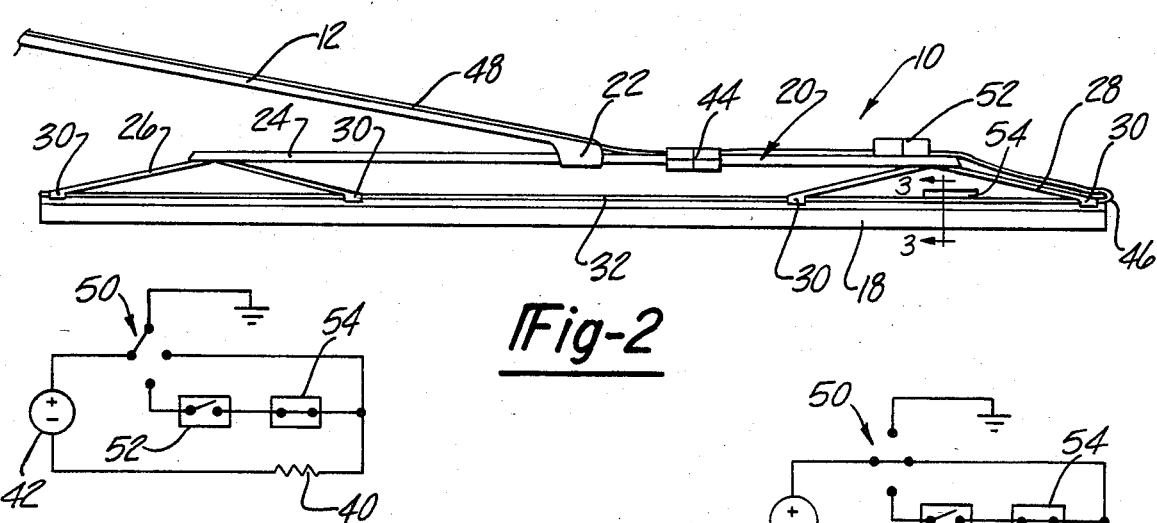
FIG. 2 is a side plan view of the wiper assembly.

Referring generally to FIGS. 1 through 3, a windshield wiper assembly 10 is thereshown embodying the present invention which is adapted to be mounted to a wiper arm 12 of a motor vehicle 14 wherein the wiper arm 12 may be oscillated back and forth in the usual manner by conventional means (not shown). The oscillating motion of the wiper arm 12 and the wiper assembly 10 facilitates removal of ice and precipitation from the windshield 16 of the motor vehicle 14. The preferred embodiment of the wiper assembly 10 generally comprises a wiper blade 18 and a supporting assembly 20 which retains and supports the blade 18 in its proper position.

Referring to FIG. 2, the supporting assembly 20 is preferably a standard assembly utilized in the industry and is demountably attached to the wiper arm 12 by conventional means 22 in order to facilitate removal and replacement of the wiper assembly 10, if necessary. The supporting assembly 20 includes an elongated central yoke 24 which is pivotally secured to the mounting member 22. Pivotally connected to the opposite outer ends of the central yoke 24 are blade supporting members 26 and 28. The blade supporting members 26 and 28 utilize a series of clips 30 which form a channel to retain the blade 18 in its proper position. The pivotal attachment of the support members 26 and 28 to the yoke 24 and the spacial arrangement of the clips allows the blade 18 to closely conform to the windshield 16 while the wiper assembly 10 oscillates across the vehicle windshield 16.

Referring now to FIGS. 2 and 3, the supporting assembly 20 also includes an elongated backing support 32 which extends substantially the length of the blade 18 and the supporting assembly 20. The backing support 32 forms a channel with inwardly extending projections 34 which support and retain the wiper blade 18 over substantially the entire length of the blade 18. The backing support 32 and blade 18 are mounted to the supporting assembly 20 by sliding the blade and support through the channels formed by the clips 30 such that the supporting members 26 and 28 secure the blade 18 in its proper position. Although the preferred embodiment contemplates a backing support 32 which is demountably secured to the supporting members 26 and 28, in the alternative the backing 32 may be integrally formed with the members 26 and 28 whereby the blade 18 would be secured to the supporting assembly 20 by sliding the blade 18 through the channel formed by the projections 34.

As is best shown in FIG. 3, a heating element 40 is disposed within the channel of the backing support 32 between the blade 18 and the backing support 32. The heating element 40 is preferably secured to, but insulated from, the backing support 32 and consists essentially of a resistive element which produces heat when connected to an electrical power source 42, preferably the battery (not shown) of the motor vehicle 14. An electrical connector or plug 44 is disposed in the electrical lead 46 between the power source 42 and the heating element 40 in order to facilitate removal and replacement of the heating element 40 and the backing 32 without requiring replacement of the entire electrical system which comprises the preferred embodiment of the present invention.

Referring to FIGS. 2 and 4A-4C, control of the heating element 40 is accomplished by a variety of means which permit the heating element to be actuated and deactuated either automatically or manually. A three-way switch 50 allows the vehicle user to manually control operation of the device 10. In the preferred embodiment, the switch 50 is located in the passenger compartment of the vehicle 14 in close proximity to the wiper control switch. However, it is to be understood that the control switch may be located in any convenient place on the vehicle or may be eliminated completely in which case the device 10 will operate automatically, as will be described hereinafter.

Figure 4A:
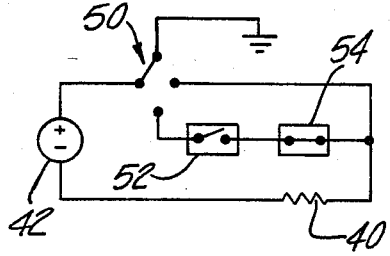
FIG. 4A is a schematic diagram of the electrical circuit of the present invention in the deactivated mode.
Figure 4B:
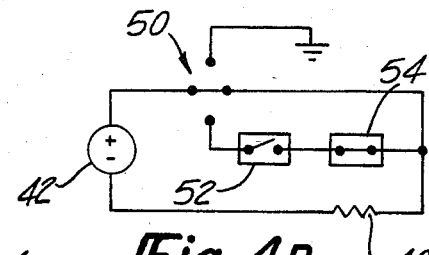
FIG. 4B is a schematic diagram of the electrical circuit of the present invention in the continuous mode.

FIG. 4A shows the switch 50 in the "off" position wherein no power is supplied to the heating element 40. FIG. 4B shows the switch 50 in the "on" or continuous position. With the switch 50 in this second position, all automatic controls are bypassed and power is supplied to the heating element 40 continuously until deactuated by the user. By placing the switch 50 in either the "on" or "off" position, the user is able to control the heating element 40 during extreme weather conditions such as severe cold or mild temperatures.

Figure 4C:
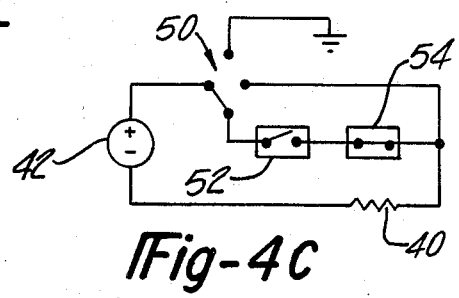
FIG. 4C is a schematic diagram of the electrical circuit of the present invention in the automatic mode.

The third operational mode, shown in FIG. 4C, allows the user to place the heating element 40 in automatic operation dependent upon the temperature of the ambient air and the heating element. Because the heat produced by the element 40 tends to be excessive in continuous operation thereby increasing deterioration of the blade 18, it is preferable to actuate the element 40 only when necessary. As is shown in FIGS. 2 and 4C, the wiper assembly device 10 is provided with a first temperature responsive means 52 and a second temperature responsive means 54 which independently control actuation and deactuation of the heating element 40 according to predefined temperature parameters.

The first temperature responsive means 52 is preferably secured to the blade supporting assembly 20 remote from the heating element 40 and actuates the heating element 40 when the ambient air temperature falls below a predefined temperature. In the preferred embodiment, the first temperature responsive means 52 is a bimetallic thermostat which completes the electronic circuit of the device 10 when the air temperature falls below, for example, 32° Farenheit or 0° Centigrade. Conversely, when the ambient temperature rises above the predefined level, the bimetallic thermostat of the first detecting means 52 deactuates the heating element 40. Thus, the first detecting means 52 actuates the element 40 only when the ambient air temperature warrants defrosting of the wiper blade 18, i.e. when the temperature falls below freezing. Moreover, although the preferred embodiment contemplates actuating the element 40 when the air temperature falls below freezing, it is to be understood that the thermostat 52 can be set at any desired limit whereupon the element 40 will be actuated or deactuated.

The second temperature responsive means 54 is secured in close relation to the heating element 40 in order to efficiently detect the temperature of the element 40 and the blade 18. As is shown in FIG. 3, the first detecting means 54 is preferably molded into or secured to the backing support 32 in close relation to the element 40 and actuates or deactuates the element 40 according to its temperature. In the preferred embodiment, the second temperature responsive means 54 is a bimetallic thermocoupler which, under normal conditions, completes the electronic circuit of the present invention. In the event the temperature of the heating element 40 rises above a predefined temperature, the bimetallic thermocoupler of the second temperature responsive means 54 disconnects the circuit thereby deactuating the element 40. As with the thermostat 52, the temperature limit of the thermocoupler 54 can be pre-set at any desired limit, however, it is preferred to set the limit such that damage and deterioration of the blade 18 is prevented.

The present invention is designed to be utilized with a conventional supporting assembly 20 and wiper blade 18. In the preferred embodiment, the electrical lead line 46 is secured to the supporting assembly 20 and the wiper arm 12 by a plurality of clips (not shown) or similar mounting means. Similarly, the plug or connection 44 and the thermostat 52 may also be demountably secured to the supporting assembly 20 although it may be sufficient to secure the lines 46 in order to secure the remaining elements of the device 10. Alternatively, the lines 46 and the thermostat 52 can be molded directly into the supporting assembly 20 thereby eliminating the exposed electrical circuitry. Moreover, the backing support 32 and, thus the heating element 40, may be molded directly to the clips 30, thereby forming a one-piece supporting assembly 20 and backing support 32. In the event of malfunction, the entire assembly can therefore be disconnected and replaced simply by removing the blade 18 and disconnecting the plug 44.

The present invention may be operated in either automatic or manual mode. It is preferred that the heating element 40 be operated in automatic mode (FIG. 4C) in order to prevent damage to the wiper blade 18 and electrical system. By operating in automatic mode, the device may be utilized while the vehicle is unattended such as when it is parked overnight. In automatic mode, as the ambient temperature falls below a predefined level the first temperature responsive means 52 completes the electrical circuit connecting the vehicle power source 42 to the heating element 40 which heats the wiper blade 18. As the temperature of the heating element 40 rises, second temperature responsive means 54 disconnects the circuit at a preferred temperature. When the heating element 40 cools sufficiently below a specific temperature, the second temperature responsive means 54 again completes the circuit. This cycle is continued until either the ambient temperature rises above the predefined level thereby deactivating the thermostat 52 or the user switches the system to manual mode.

Thus, the present invention allows intermittent control of the heating element 40 according to predefined temperature limits. In addition to preventing damage to the wiper blade and electrical system because of overheating, the vehicle power source is not drained significantly since heat is provided only when necessary and only for intermittent intervals.

Having thus described my invention, many modifications thereto will become apparent to those skilled in the art to which it pertains without deviation from the spirit of the invention as defined by the scope of the appended claims.

I claim:

1. A heated windshield wiper assembly adapted to be mounted on the wiper arm of a motor vehicle, said wiper assembly comprising:
   a flexible wiper blade;
   a wiper blade supporting assembly wherein said supporting assembly demountably supports said wiper blade;
   a heating element secured to said supporting assembly, said heating element extending substantially the length of said supporting assembly;
   means for pivotally securing said supporting assembly to said motor vehicle wiper arm;
   means for conducting electrical power from the power source of said motor vehicle to said heating element;
   first temperature responsive means for detecting the ambient air temperature, said first temperature responsive means secured to said blade supporting assembly; and
   second temperature responsive means for detecting the temperature of said heating element.

2. The wiper assembly as defined in claim 1 wherein said heating element is secured to said supporting assembly in close relation to said wiper blade.

3. The wiper assembly as defined in claim 2 wherein said heating element is disposed between said supporting assembly and said wiper blade.

4. The wiper assembly as defined in claim 1 wherein said second temperature responsive means is secured to said supporting assembly.

5. The wiper assembly as defined in claim 1 wherein said first temperature responsive means actuates said heating element when the ambient temperature falls below a predefined minimum.

6. The wiper assembly as defined in claim 4 wherein said second temperature responsive means deactuates said heating element when the temperature of said heating element rises above a predefined maximum.

7. The wiper assembly as defined in claim 1 wherein said conducting means detachably connects said heating element to said power source.

8. The wiper assembly as defined in claim 1 further comprising means for manually deactuating said heating element.

9. The wiper assembly as defined in claim 1 further comprising means for manually bypassing said first and second temperature responsive means.

10. The wiper assembly as defined in claim 5 wherein said first temperature responsive means comprises a bimetallic thermostat switch.

11. The wiper assembly as defined in claim 6 wherein said second temperature responsive means comprises a bimetallic thermocoupler switch.

12. The wiper assembly as defined in claim 7 wherein said heating element is detachably connected to said power source by a detachable plug.

* * * * *